United States Patent
Chaplin

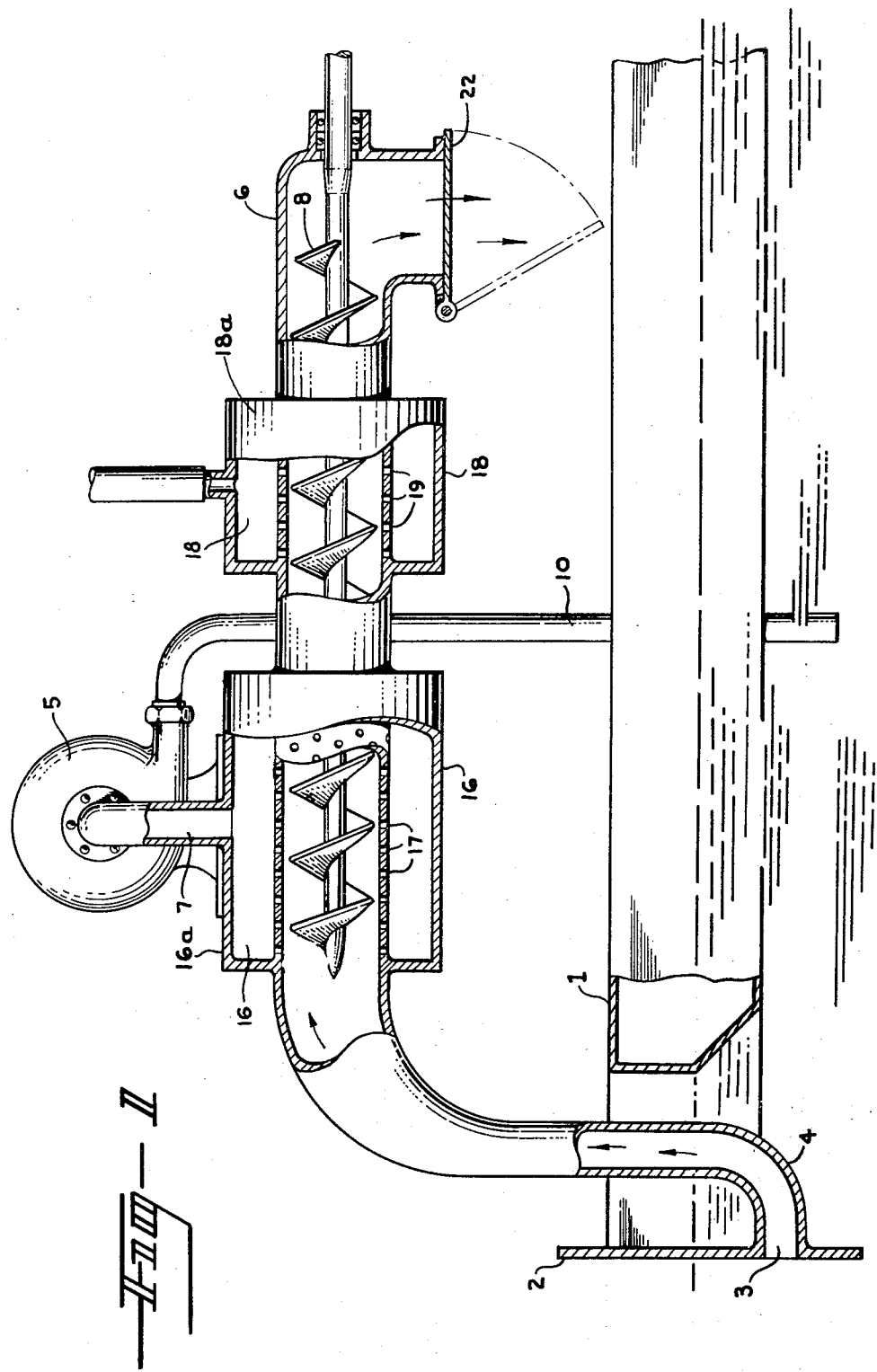

[15] 3,707,070
[45] Dec. 26, 1972

[54] METHOD OF PROCESSING WEEDS

[72] Inventor: Merle P. Chaplin, 609 Driver Avenue, Winter Park, Fla. 32789

[22] Filed: Nov. 5, 1971

[21] Appl. No.: 196,242

Related U.S. Application Data

[62] Division of Ser. No. 875,297, Nov. 10, 1969.

[52] U.S. Cl. ........................................................56/1
[51] Int. Cl. .......................................................A01d
[58] Field of Search .............56/1, 8, 9; 37/54, 58, 59

[56] References Cited

UNITED STATES PATENTS

| | | | |
|---|---|---|---|
| 1,481,177 | 1/1924 | Bayard et al. | 56/9 |
| 2,181,863 | 12/1939 | Bell | 56/9 |
| 2,320,283 | 5/1943 | Knowlton et al. | 56/9 |
| 2,716,318 | 8/1955 | Skromme | 56/1 |
| 2,907,162 | 10/1959 | Rebikoff | 56/9 |
| 3,546,858 | 12/1970 | Chaplin | 56/9 |

*Primary Examiner*—Russell R. Kinsey
*Attorney*—Julian C. Renfro

[57] ABSTRACT

A new and improved device suitable for employment adjacent the front end of a barge or other vessel concerned with removing weeds or other marine growths from lakes, rivers or other bodies of water. Screw conveyor means are used in concert with suction means, the latter enabling the weeds to be removed from an underwater location to the location at which the screw conveyor completes the removal operation. Other facets of this invention include cutoff means disposed at an underwater location ahead of the inlet to the screw conveyor, means for controlling the rotational speed of the screw conveyor, and a novel piping arrangement whereby suction or pressure may be selectively applied to certain chambers disposed along the length of the tubular structure associated with the screw conveyor. These piping arrangements also make it possible for certain cleaning operations to be carried out on occasion, so as to backwash the weeds from certain of the chambers, and for other purposes later described.

7 Claims, 13 Drawing Figures

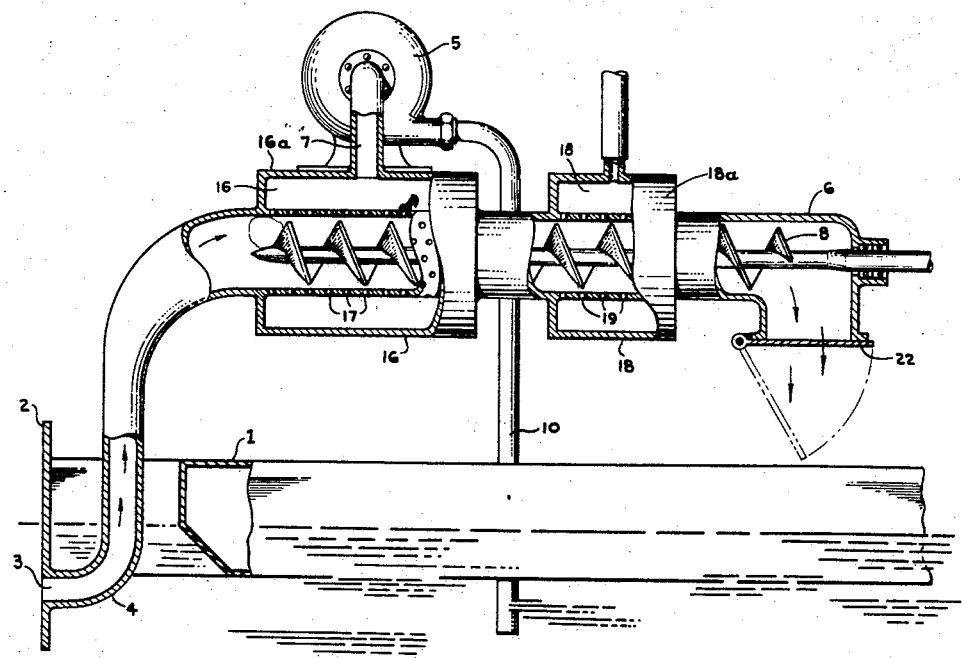

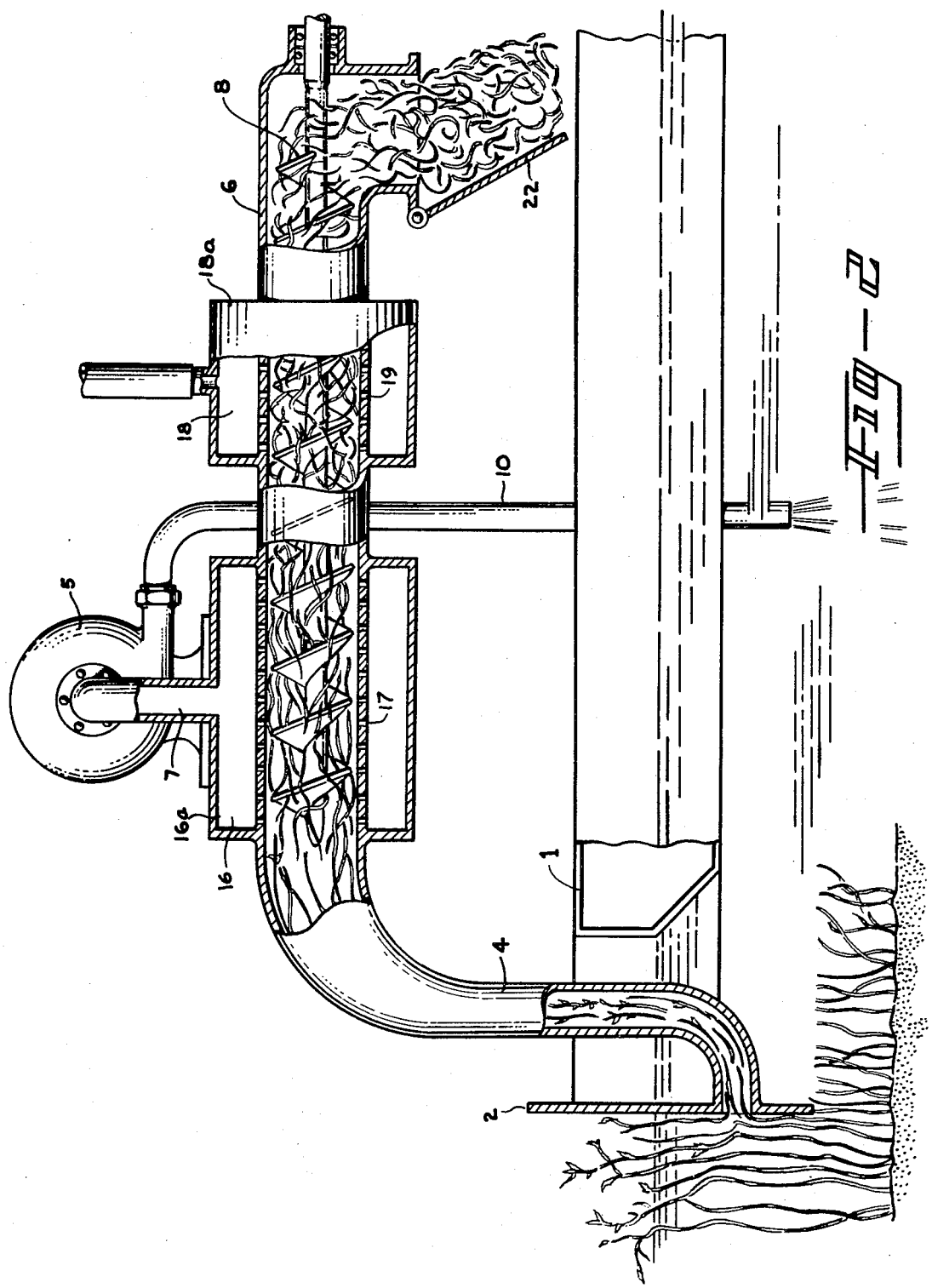

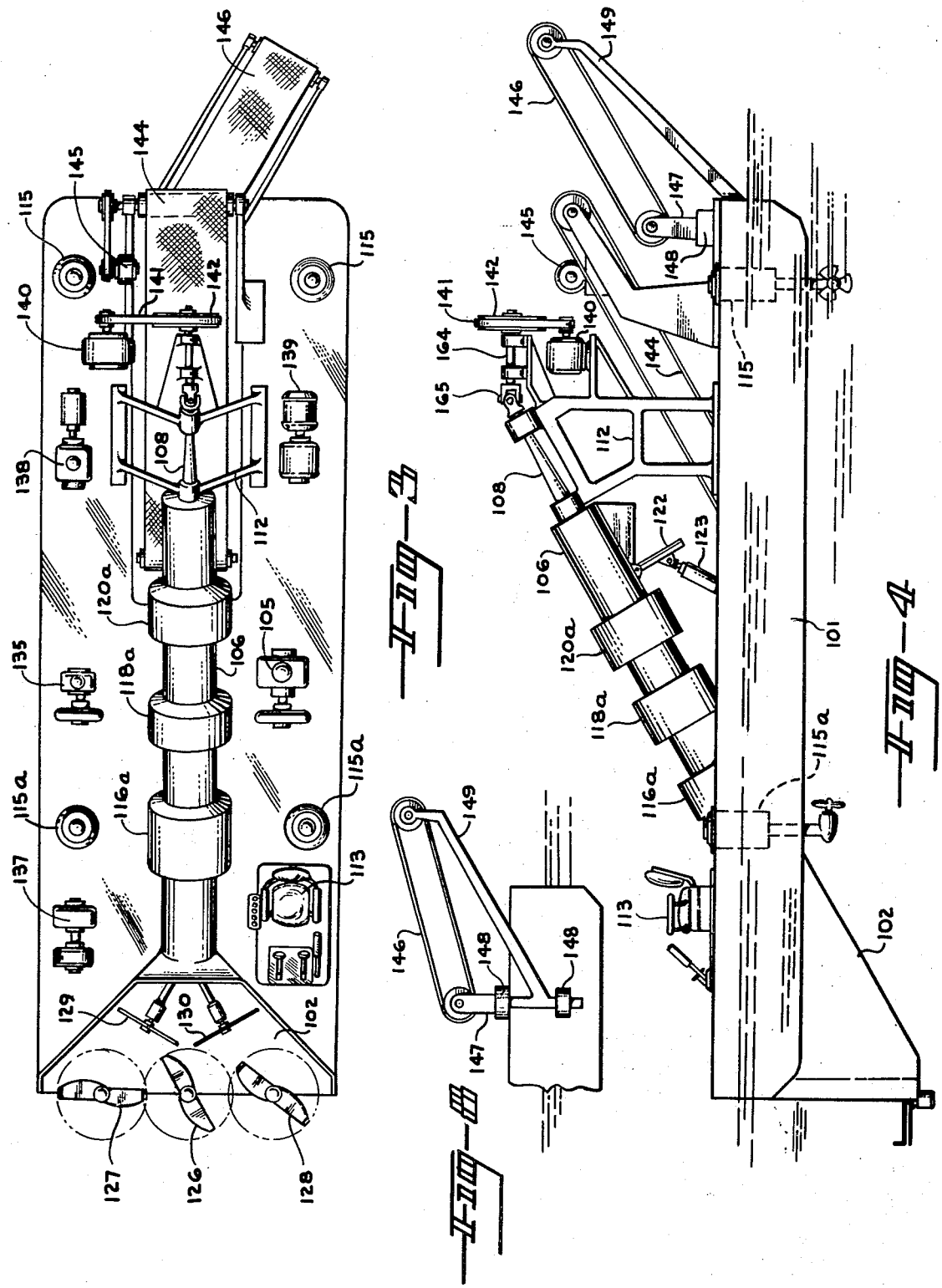

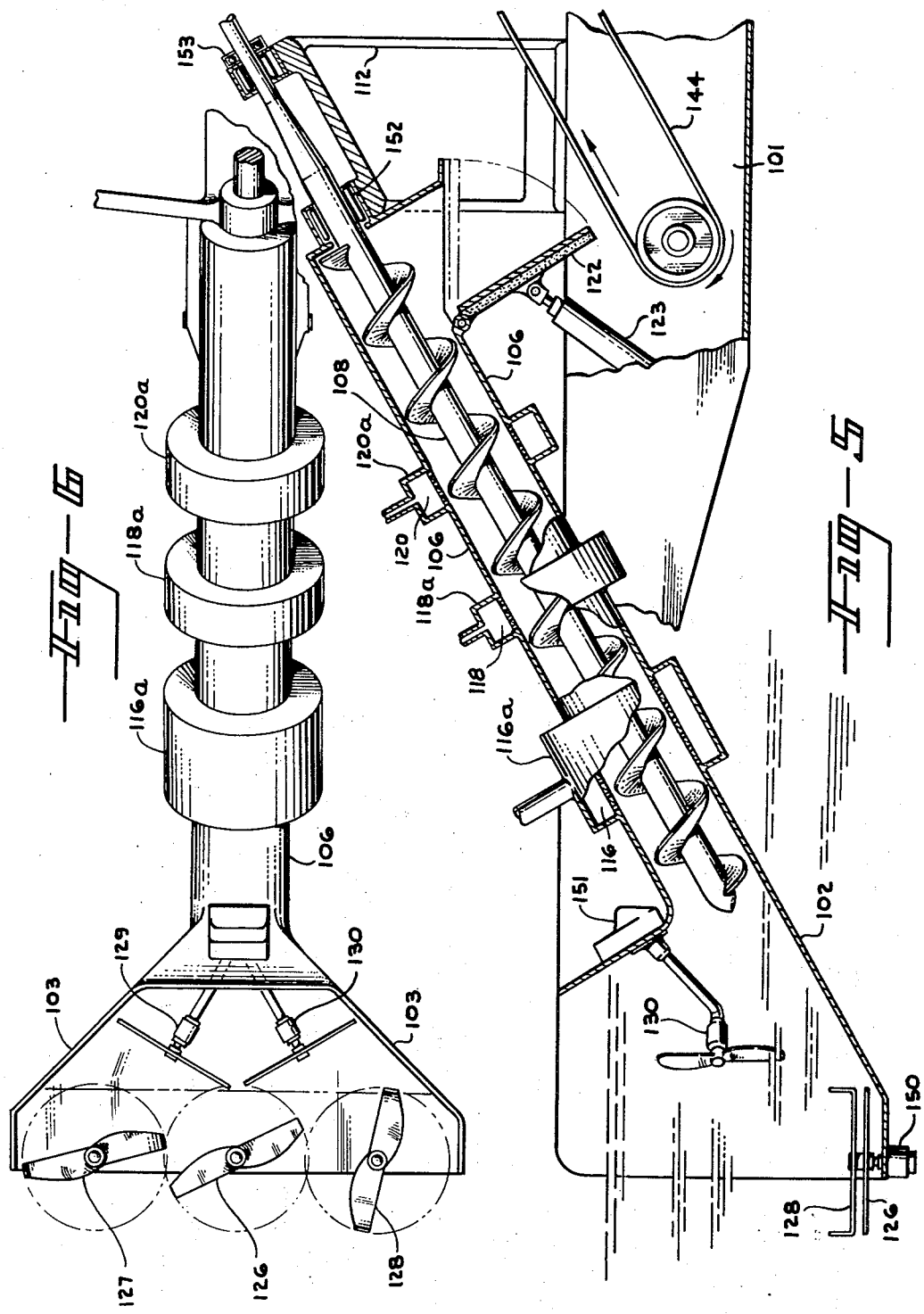

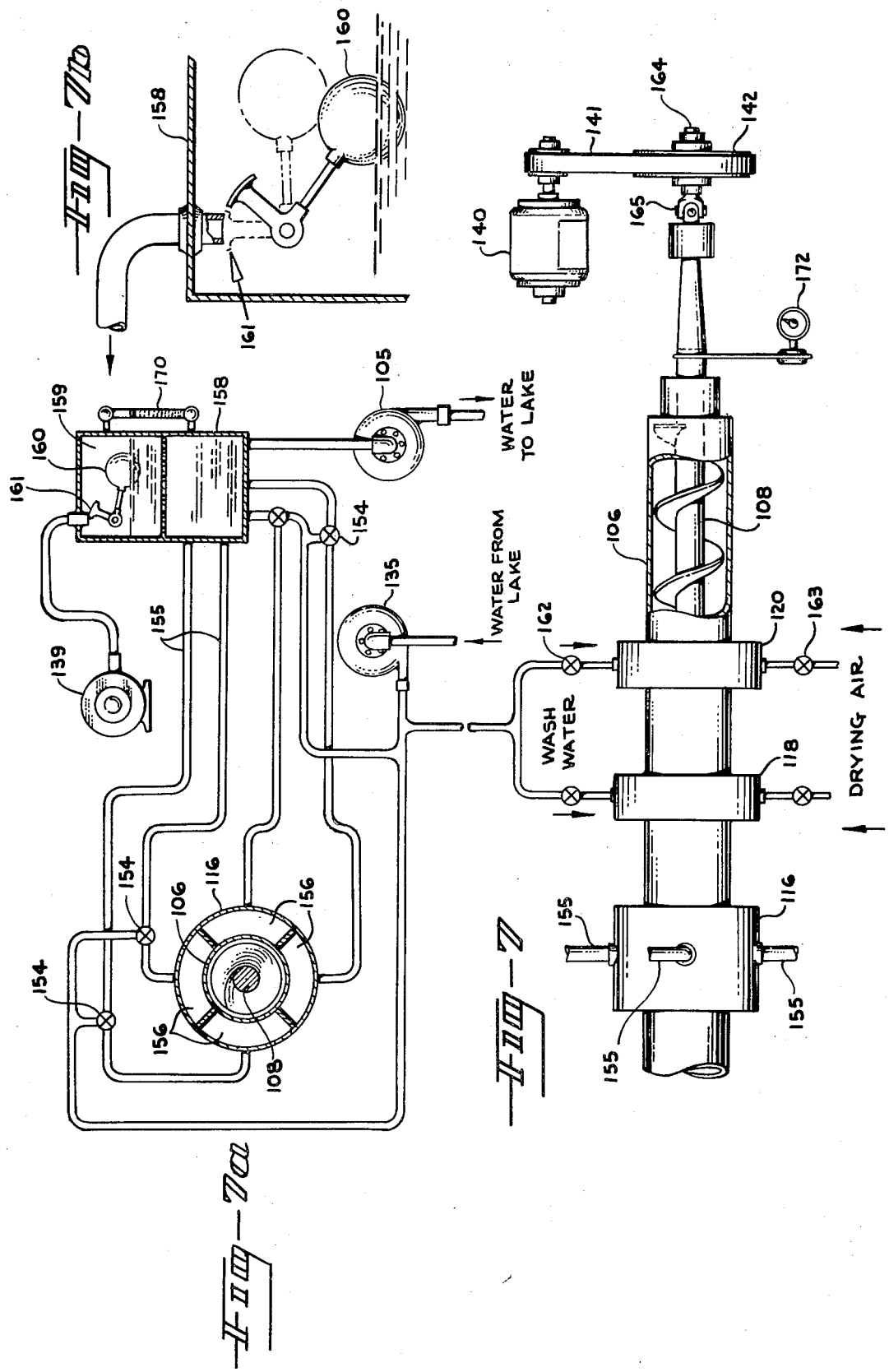

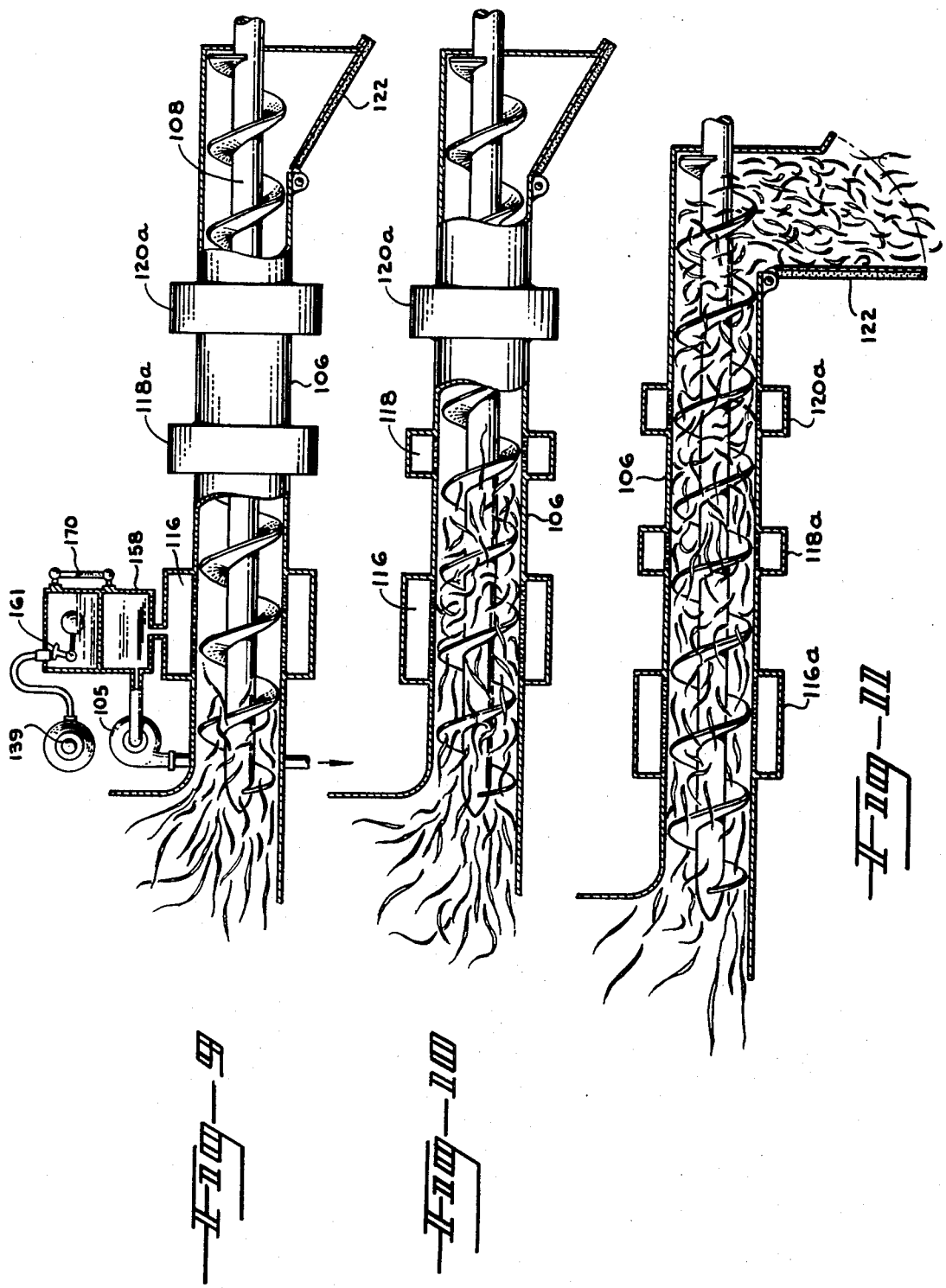

METHOD OF PROCESSING WEEDS

This is a division of application Ser. No. 875,297 filed Nov. 10, 1969.

REFERENCE TO RELATED APPLICATION

This invention may be regarded as being related to my copending application entitled "Harvesting Marine Growths", Ser. No. 798,066, field Feb. 10, 1969, now U.S. Pat. No. 3,546,858, in which is disclosed a method and apparatus for removing the growths from a body of water and of processing them into a usable product. The device in accordance with the present invention was designed to replace the submerged opening, the suction pump through which the weed pass, and the separating screen taught in the earlier invention inasmuch as these were found to be a limiting factor in some instances.

BACKGROUND OF THE INVENTION

1. Field of the Invention

This invention pertains to the removal of marine growths from a basin of water, such as a lake, pond, river or other body, and more particularly to an arrangement for harvesting growths in a rapid and efficient manner for subsequent disposal. 2. Description of the Prior Art Devices for harvesting marine growths are recognized utility, both from the standpoint of clearing lakes and rivers, as well as for crop value. However, the devices of the prior art, as discussed at length in my above-cited application, involved an intricate amount of machinery, were often dangerous to use, were relatively ineffective, and usually had small capacity.

SUMMARY OF THE INVENTION

This invention provides a weed pump that is not capacity limited, and in contrast to prior art patents, is highly effective. It principally involves a self-propelled floating structure upon which a highly effective weed pump is operatively mounted, such weed pump taking the form of a combined suction arrangement and screw conveyor. The suction arrangement not only serves to bring the marine growths to a location inside the vessel such that they can be engaged by the conveyor, but also serves to almost completely dewater the weeds so that denser weeds will be engaged by the conveyor at the commencement of the procedure whereby the weeds are conveyed from the point of water removal to a delivery position.

In order that the operation of my weed pump may be as effective as possible, I may utilize a plurality of cutters adjacent the inlet to the tubular structure in which the screw conveyor is disposed, these devices serving to cut the weeds into suitable lengths for further processing, as well as also serving to propel them into the inlet of the weed pump.

Weeds conveyed by the screw conveyor may thereafter be deposited on suitable conveyor belts so that they may be delivered to a rear portion of the vessel for loading onto an accompanying vessel for disposal.

My invention also includes certain innovations associated with the various pumps utilized on the vessel to accomplish the movement and cleaning of the plants, with such arrangement including means for backwashing certain portions of the water extraction chambers associated with the screw conveyor so that any tendency of the screen areas to become partially clogged is eliminated.

It is therefore a principal object of my invention to provide a weed pump of an unusually high capacity that may serve to dewater weeds in a very effective manner, thus enabling large amounts of waterfront property or waterways to be cleared at a maximum expense, with subsequent use of the weeds or disposal thereof being easily accomplished.

It is another object of my invention to provide a weed pump having highly effective operating characteristics, which may be cleaned during operation, thus avoiding frequent shut-down for cleaning as a result of the build-up of weeds in certain portions of the device.

These and other objects, features and advantages will be more apparent from a study of the enclosed drawings in which, FIG. 1 is a simplified showing of a weed pump in accordance with this invention, in which certain portions are removed in the interests of clarity;

FIG. 2 is a view closly resembling FIG. 1, but revealing the flow of marine growths through the device;

FIG. 3 is a plan view of a barge or other vessel arranged to carry my weed pump, with certain pieces of ancillary equipment also there being revealed;

FIG. 4 is a side elevational view of the barge shown in FIG. 3, this figure revealing other details of the screw conveyor and the weed conveying apparatus;

FIG. 5 is a cross-sectional view to a larger scale revealing certain portions of the screw conveyor and the tubular structure in which it is operatively disposed;

FIG. 6 is a plan view of the weed pump as shown in FIG. 5;

FIG. 7 shows a fragmentary view of a portion of the device shown in FIGS. 4 and 5;

FIG. 7a is a piping diagram illustrating among other items the apparatus which may be utilized during operation of the device to clean the various compartments of the primary chamber that surrounds the weed pump, so that the weed pump need not be shut down for cleaning;

FIG. 7b is an enlarged showing of the valve and float arrangement that may be utilized for controlling the amount of vacuum applied to the extraction tank illustrated in FIG. 7a;

FIG. 8 is a fragmentary showing of the horizontally movable belt conveyor that may be utilized at the rear end of the barge;

FIG. 9 is a fragmentary or cut-away showing of the weed pump in operation, illustrating the suction apparatus for initially dewatering the weeds as well as for attracting them into the tubular structure surrounding the screw conveyor;

FIG. 10 is a view revealing the screw conveyor partially loaded down with weeds, with the rear door still in the closed position necessary in order that an initial vacuum may be established; and FIG. 11 is a view revealing the weed pump in full operation, with the rear door in the open position to enable the agress of the dewatered weeds.

DETAILED DESCRIPTION

Referring first to FIG. 1, I have there shown an exemplary version of the intake portion of my invention, including the front portion of a floating structure or barge 1, on the forward end of which is disposed a plate or shield 2. An orifice or elongated opening 3 is disposed in the plate at a location below water level. To this opening is connected a curved pipe 4, which at its upper end terminates in a tubular structure 6, which in turn is connected by a pipe 7 to a suction pump 5. It is the purpose of this arrangement to cause the aquatic weeds or plants contacting the shield 2 to be drawn into the orifice 3, up the curved pipe 4 and thence into the tubular structure 6.

It will be noted that a helical element or screw conveyor 8 is rotatably disposed in the tubular structure 6, being driven in rotation by a suitable rotary means such as a motor. As will be understood, the weeds caused to reach the screw conveyor 8 as a result of the reduced pressure provided by pump 5 will by the operation of the conveyor be caused to move along the tubular structure to the right in the manner shown in FIG. 2.

It will be noted in FIGS. 1 and 2 that a chamber 16 somewhat larger than the diameter of the tubular structure is defined by a cylindrical member 16a disposed about a forward portion of the tubular structure, with a number of perforations 17 being disposed in the sidewall of the tubular structure at locations inside the chamber so that water contained in the entering plants and weeds can be drawn off. It is to the chamber 16 that the pump inlet pipe 7 is connected, so that the reduced pressure provided by the pump 5 is manifested in this chamber. The perforations 17 are disposed about all sides of the tubular structure at the location of the chamber 16, so that the reduced pressure existing in this chamber will cause water to leave the plants and weeds in substantially all directions, drawn therefrom by pump 5, and thence be returned back to the lake or other body of water through the pipeline 10. Thus, the weeds do not pass through the pump itself.

A second chamber 18 may be disposed about the tubular structure adjacent the first chamber, being defined by a cylindrical member 18a disposed in surroundings relationship about a midportion of the tubular structure, with perforations 19 disposed in the sidewall inside chamber 18 so that more water may be removed at this location. Alternatively, the weeds caused by the helical conveyor 8 to travel along the tubular structure 6 can be treated at the location of chamber 18 by the application of air or some other gas, to facilitate their subsequent utilization.

As will be obvious, the arrangement of the helical conveyor 8 is not such that it can pull and move weeds from the lake as they enter the elongated opening 3, up through the tubular structure. For that reason, I arrange the main suction pump 5 so that a reduced pressure will be created in the chamber 16 and therefore by suction causing the weeds to pass upwardly thru the curved pipe 4 and thence into the inlet of the tubular structure until such time as the action of the helical conveyor can cause the dewatered weeds to move along the entire length of the tubular structure in the manner shown in FIG. 2. Also, as has been mentioned, an effective dewatering of the weeds takes place at this time as a result of the operation of the chamber 16.

It will be apparent that a reduced pressure cannot be established in the interior of the tubular structure 6 if the rear end thereof is open, and for that reason I have provided a door or hinged gate 22 at the rear end of the tubular structure, which can remain tightly closed during the first phase of the operation of this device, but which can be caused to open, such as by the pressure of the seeds and plants at such time as they have reached the rear end of the tubular structures, or alternatively by manual means. Suitable means are provided to catch the plants, for subsequent use or disposal.

Referring now to FIGS. 3 and it will be noted that the full length of the barge 101 is there shown, upon which is disposed equipment generally similar to that just discussed, but in this instance the tubular structure 106 is disposed at an angle thereto, with the forward opening of the tubular structure attached to a V-shaped entry portion 102 extending somewhat below the surface of the water, as revealed in FIGS. 4 and 5. The tubular structure 106 in effect extends upwardly from this V-shaped entry portion, with the upper end of the tubular structure being supported by a suitable framework 112. As before, the reduced pressure caused by a suction pump to exist in the forwardmost chamber 116 defined by cylindrical housing 116a causes weeds and plants to enter the tubular structure 106 to such an extent that the screw conveyor 108 (FIG. 5) can engage the weeds and plants and move them along as described in conjunction with conveyor 8 in FIGS. 1 and 2.

However, it is desirable in connection with the arrangement shown in FIGS. 3 through 6 to achieve a cutting off of underwater plants, and also to have plants of reduced length entering the tubular structure. To this end, a plurality of rotary cutters may be utilized, mounted in front of the inlet to the tubular structure, on the entry portion 102. Rotating well below the water surface are a plurality of rotary blades or cutters 126, 127 and 128, with the two outside blades located just above the level of the middle blade 126, and with the intercepted areas of the blades overlapping slightly so that the growths are effectively cut off at a deep level. Preferably, the pitch of the blades is upward so that as the growths are cut, they are projected toward the inlet to the tubular structure 106.

Although I may draw the weeds directly by suction into the tubular structure or employ underwater weed harvesting equipment of the reciprocating cutter type, I prefer to utilize equipment which will shorten their length and reduce entanglement common in many areas. It is also desirable to cut the weeds at a substantially greater depth below the lake level than presently available equipment permits so that their continued growth will not interfere with boating and other water activities for a considerable period of time, thereby allowing longer times between harvesting an area.

It is usually preferable to utilize additional rotary blades 129 and 130, mounted so as to achieve further cutting and to serve as an additional force in causing the weeds and plants to be moving toward the entrance of the tubular structure. The cutting action of all these blades when taken collectively serves to shorten the length of the growths and reduces the entanglement generally found in aquatic plants, enabling them to be drawn into a more compact and homogeneous condition into the tubular structure 106 and then carried upwardly by the helical member 108.

The tubular structure shown in FIGS. 3 through 6 is equipped with chambers 116 and 118 generally along the lines of the chambers 16 and 18 shown in connection with FIGS. 1 and 2, but in this instance a third chamber 120 has been added. Each chamber is defined by a respective cylindrical member 116a, 118a and 120a disposed in surrounding relationship about a portion of the tubular structure 106. As before, these chambers can be utilized in the best manner desired, as already described. Chambers 118 and 120 surround the tube 106 and communicate with the tube interior thru perforations in the tube wall. The chambers can be supplied with water or air under the control of the operator. If the condition of the weeds in the tube is such that they do not pack tightly, water may be introduced into chamber 118 to seal this tube area against too great an air flow through the discharge opening 122. The water so introduced is extracted thru chamber 116. Water can also be used at this point to wash or clean the weeds in cases where they may be harvested close to the lake bottom resulting in more or less dirt and silt being drawn in with the weeds.

Under optimum conditions, however, the weeds are suitably cut and shortened in length by the underwater cutting mechanism, in which case they will be tightly packed. Air may be admitted to one or both chambers 118 and 120, drawn thru the weeds in the tube, and extracted by chamber 116, thus serving to remove additional water from the weeds.

FIG. 3 and FIG. 4 each reveal the use of an operator's seat 113 equipped with suitable controls so that the operator can perform the numerous functions associated with the operation of all aspects of this device, including maneuvering the barge. Directly behind the operator's seat is one of the four propulsion units that may be utilized on the barge, with FIG. 3 revealing that two propulsion units 115A are thus located near the front corners of the barge, and two similar units 115 at or near the rear corners of the barge. Each of these units is rotatable at the behest of the operator to a very wide extent so that their propulsive efforts can be directed in whatever manner necessary for the barge to move in a desired direction despite adverse currents or winds, or to turn around in a confined location. This latter may be accomplished by turning the forward units say to the right and the rear units say to the left. These propulsion units preferably electric devices powered by current from an electric generator, but may of course be gasoline engines or hydraulic motors. Also revealed in FIG. 3 are the main suction pump 105, the water pump 135, electric generator 137, hydraulic fluid source 138, vacuum pump 139, and the motor 140, preferably an electric motor. This motor is connected by belt 141 so as to drive in rotation the wheel 142 mounted adjacent the upper end of the helical conveyor 108, to drive latter device in the manner necessary to cause the weeds to travel up the tubular structure 106.

The weeds leaving the upper end of the helical compressor are allowed to drop upon a conveyor belt 144 which inclines upwardly and toward the rear of the barge, which belt is driven by motor 145. Both motor 140 and 145 are powered by the current from the electric generator 137, and controlled by the operator seated in seat 113. Weeds are carried by this belt conveyor to its uppermost position, and are then allowed to drop upon similarly inclined belt conveyor 146, which differs from conveyor 144 by typically being disposed at an acute angle to the centerline of the barge. Actually, this second conveyor may be arranged to be rotatable so as to be able to deliver weeds either directly to the rear of the barge, or at one side thereof, as may be desirable or convenient. Conveyor 146 is preferably mounted on a swinging support 147 supported by suitable bearings 148 on the rear deck of the barge. An extension bracket 149, movable with 147, supports the outer roller of the conveyor, which conveyor may of course be driven by any suitable means, not shown. Additional detail of the second conveyor are apparent in FIG. 8.

Other details associated with this embodiment of my invention are to be noted in FIG. 4, including the upper or driving portion of the screw conveyor 108, and the short shaft 164 upon which the wheel 142 is mounted. A universal joint 165 may be utilized between the upper end of the screw conveyor and the shaft 164 as may be necessary consonant with good design practice. The door or gate 122 is shown in the open position to enable the weeds to fall upon the conveyor belt 144, with it being understood that actuator 123, which may be a hydraulic actuator, may be energized to close this gate at such time as a vacuum is to be established in the tubular structure 106. When the weeds have traveled to the location adjacent the door or gate 122, a suitable trigger means may be employed to cause the actuator 123 to open the gate, or the operator may open the gate directly.

FIGS. 5 and 6 show in greater detail the helical conveyor 108, the chambers 116, 118, and 120, and the weed cut-off means, described earlier in the preceding figures. FIG. 5 shows the spacing between the cutters 126 and 128 as well as revealing that the outer blade 128 preferably has vertical cutting edges as well as of course the horizontal cutting edges. The vertical cutting edges help to separate the weeds at the terminus or edges of the collecting member 102, and to direct them along the walls 103 toward the rotating blades 129 and 130, and of course toward the forwardmost portion of the helical conveyor 108, where they will be drawn into the conveyor by suction. The blade portions of the cutters 129 and 130 can be configured or pitched so that they tend to move the weeds toward the conveyor 108, in addition of course to providing the aforementioned cutting action. I preferably use hydraulic motors for powering the rotary cutters, such as the motor 150 for driving cutter 128, and the motor 151 for powering cutters 129 and 130, the hydraulic fluid of course being supplied from pump 138.

The screw conveyor 108 is revealed by FIG. 5 to be supported at its upper end, and so as to provide the best possible opening for the weeds to enter the tube 106 at the lower end under the influence of the suction, the lower end of the spiral conveyor is tapered both as to the central shaft and the end of the spiral. Also, there is no beating support for this end of the conveyor as this would impede the weed flow into the tube 106. To maintain the spiral in the approximate center of the tube and avoid undesirable metallic contact, the upper or delivery end of the supporting shaft is extended as shown in FIGS. 4 and 5 and carried by two bearings 152 and 153. Shims or other adjusting device are provided between the two bearings and the support member 112 so by a cantilever action in holding the upper bearing 153 down, the lower end of the spiral conveyor can be lifted out of contact with the tube and maintained in a central position.

Referring to FIG. 7a, it will be noted that I have there shown piping arrangement that may be utilized in connection with the one or more of the chambers disposed about the circumference of the tubular structure 106. Four compartments 156 are revealed in FIG. 7a to surround the tubular structure, with separate pipes 155 being connected to each of these compartments. The illustrated compartments in FIG. 7a are assumed to define the first chamber 116, which chamber is also shown in FIG. 7. A three-way valve 154 is preferably disposed in each of the pipes 155, which pipes are connected at locations beyond the three-way valves to an extraction tank 158. Normally the water accompanying the weeds is drawn through the pipes 155 by the action of the extraction pump 105, with of course the three-way valves being positioned in such a manner as to make this possible. As a result of this form of suction, most of the water is removed from the weeds thru the tube perforations in the tube wall, but in so doing there is a possibility that these perforations may become plugged with small weed particles and it is desirable to provide manual or automatic means whereby pressure may be applied to the tube perforations in the opposite direction to the suction operation to expel any weed mater which may have become lodged in these openings.

It is within the purview of this portion of my invention to effect a cleaning off of the weeds from the perforations, this being accomplished by a form of backwashing operation. This is brought about by manipulating a chosen three-way valve 154 to cut off the suction from 105 to its respective compartment 156, and then manipulating this valve so that water under pressure from the pump 135 may be caused to flow into that compartment, thus forcing the growths that may have lodged in the perforations back away from the perforations, from which locations the growths can be carried away by the action of the screw 108. As will be obvious, the backwashing of the various compartments 156 can be accomplished one after the other by the successive manipulations of the three-way valves 154 in the appropriate manner. Thus, all four compartments of this chamber, or for that matter the cleaning of all chamber compartments used in connection with my device can be accomplished without shutting down the operation of the screw conveyor or halting the motion of the barge over the lake or other body of water.

There is a certain amount of air frequently included in the growths, or air may be admitted to the tube to remove weed moisture. Such air may interfere with the operation of the extraction pump 105, so it is desirable to separate this air from the water. This is done by providing the tank 158 with an upper chamber 159 in which is disposed a float 160 which controls the opening of a valve 161 connected to the source 139 of suction or vacuum. This enables a constant waterhead to be kept on pump 105, which is generally desirable. Thus suction arrangement is also particularly advantageous in connection with the starting procedures, as was previously mentioned.

As is shown in FIG. 7, pipe connections are provided to the chambers 118 and 120, one being water connections being controlled by valves 162, and the others by air connections controlled by valves 163. These valves are selectively operated by the operator in order to obtain the optimum or best condition of the growths as they emerge from the opening at the upper end of the tubular structure 106.

Turning to FIGS. 9 through 11, it will be noted that I have there portrayed by appropriate fragmentary or cut-away views, the operation of a weed pump in accordance with this invention, over a range of operating conditions. FIG. 9 reveals the beginning flow of weeds into the inlet to the tubular structure 106, this being brought about by the application by pump 105 of a reduced pressure to primary chamber 116. Inasmuch as the door 122 is at this time in the closed position, a substantial reduced pressure may exist in the tubular structure, thus enabling the weeds to be caused to flow into the inlet of the device.

FIG. 10 reveals the increased filling of the tubular structure with weeds, the weeds being caused by the screw conveyor 108 to move to the rear of the device, which is to the right as shown in this FIGURE. The door 122 remains in a closed position until such time as it has been reached by the weeds, and either by the force presented by the weeds, or else by a triggering of the door actuator, the door is caused to move to the open position.

FIG. 11 reveals the flow of compressed and dewatered weeds from the exit of the weed pump, with it to be understood that inasmuch as the bulk of weeds residing in the rear of the tubular structure presents a form of "plug", the suction apparatus associated with the chamber 116 may continue to be effective in the forward portion of the tubular apparatus 106. The chambers 118 and 120 may serve the purpose of dewatering or further treatment of the weeds, as previously explained.

Inasmuch as the density of the marine growths varies in different locations, it is desirable to have a means of controlling the operation of equipment so far as capacity is concerned, and it is also desirable and more or less necessary to keep the density of the growths in the tube 106 at a reasonably constant value. One way of accomplishing this is to vary the speed of the rotation of the screw conveyor 108. Two methods are available for determining the growth density. One by the vacuum gauge 170 measuring the suction of vacuum, this being a combination of water pump 105 and the vacuum pump 139 which determines in turn the amount of suction being applied to the chamber 116. As the tube 106 inside of this chamber 116 becomes more dense with marine growths, less water will be drawn through the perforations into the chamber 116 and by the same taken the suction or vacuum applied by 105 and vacuum pump 139 will increase.

Another method of determining the density of the growths in the tube 106 can be determined by the amount of power required to operate the screw conveyor inside of this tube. These methods of determining density can be utilized together or combination to vary the screw conveyor speed by varying the speed of the electric motor 140 driving the conveyor. This motor of course could be replaced by a gasoline engine if desired.

It is desirable to relieve the operator from as much detailed operation of the apparatus as is possible, and to this end it may be desirable to maintain the engine or propulsion means 140 at a constant speed and to interpose between this means and the connection to the screw conveyor, a variable speed drive. Interposed between the engine and the variable speed drive may be a torque converter which determines the amount of power delivered by the engine to rotate the spiral conveyor. The amount of torque or driving power necessary to turn the spiral conveyor 108 will obviously vary with the density of the growths within the tube 106, and as this torque increases, it acts directly on the speed changer to automatically increase the rotative speed of the spiral conveyor 108. Conversely as the torque decreases, the speed of rotation of the spiral conveyor may be reduced.

To enable the operator to determine how the equipment is operating, a tachometer 172 driven from the shaft of screw 108 is mounted on the control panel and from experience the operator can determine what is an optimum spiral conveyor speed and control the forward motion of the barge and the collecting means and the rotary cutters in proportion to maintain this speed reasonably constant.

Another procedure for assuring that the quantity of growths delivered is reasonably constant involves metering or measuring the water drawn from the chamber 116, inasmuch as this is in a more or less direct ratio to the density of the growths inside the tubs. A water meter indicating the flow rate may be placed in the line to pump 105. The flow rate can thus be used to regulate the speed of the spiral conveyor, either by changing the electric motor speed, or the speed of the speed changer if it is desirable to keep the engine speed constant so as to maintain sufficient power.

As will be obvious, the present weed pump may be used in association with a substantial amount of the equipment set forth in my copending application Ser. No. 798,066 now US. Pat. No. 3,546,858, cited hereinbefore. In other words, after the present pump has been been substituted for the pump 5 of the earlier application, from there on the various methods of processing the growths earlier discussed may be utilized. For example, the growths may be delivered to a device similar to that shown in FIG. 10 of the prior application, and thereafter the liquid and relatively solid constituents may be delivered to tanks or bins to be transported to shore based processing, packing and shipping facilities.

In placing the equipment in operation, the barge carrying the weed pump is moved to the area where weeds are to be harvested. The door or cover 22 is closed and the vacuum pump 139 of FIG. 7a is started. This removes the air from the tube 106 and as soon as this is indicated by the water level in the gage glass 170, the suction pump 105 is started. The barge with its weed collecting apparatus is then moved into the weed area so that by the application of vacuum, the weeds can be caused to enter the lower end of the tube 106. The conveyor 108 then engages the weeds, with water being extracted thru the tube perforations and chamber 116 as the conveyor 108 moves the dewatered weeds along the tube. When the weeds reach the upper end of the tube as evidenced by pressure on the gate 22, the gate is opened and the entire equipment is in operation.

I claim:

1. The method of removing marine growths and weeds from a body of water comprising the steps of drawing the growths together with water into a tubular structure by suction, separating the water from the growths by suction while the growths are contained in said tubular structure, and thereafter mechanically removing the dewatered growths from said tubular structure.

2. The method as defined in claim 1 including the further step of cutting the growths prior to their being drawn into said tubular structure.

3. The method as defined in claim 1 including an additional step of supplying wash water to the growths while in said tubular structure, such water being thereafter removed from the growths by the same suction method as is used to draw the growths into said tubular structure.

4. The method as defined in claim 1 including the step of supplying air to the growths while in said tubular structure, such air thereafter being removed from the growths and serving to remove moisture therefrom, accomplished by the same procedure used to draw the growths into said tubular structure.

5. The method of removing marine growths from a body of water utilizing a tubular structure in which is rotatably mounted a helical conveying element, comprising the steps of drawing the marine growths by suction into the inlet of the tubular structure so that they can be engaged by the helical conveying element, and thereafter discharged from the opposite end of the tubular structure.

6. The method as defined in claim 5, including the further step of applying a suitable gas to the growths as they are being dewatered.

7. The method as defined in claim 5, including the further step of cutting the weeds prior to the application of suction thereto.

* * * * *